United States Patent [19]
Fesko

[11] Patent Number: 4,630,804
[45] Date of Patent: Dec. 23, 1986

[54] LEAF SPRING CLAMP FOR SYNTHETIC MATERIAL LEAF SPRING

[75] Inventor: Donald G. Fesko, Allen Park, Mich.

[73] Assignee: Ford Motor Company, Dearborn, Mich.

[21] Appl. No.: 689,364

[22] Filed: Jan. 7, 1985

[51] Int. Cl.$^4$ ............................................. F16F 1/30
[52] U.S. Cl. ...................... 267/52; 267/149; 403/226
[58] Field of Search ................. 267/36 R, 38, 40, 42, 267/43, 44, 47, 49, 51, 52, 53, 148, 149; 403/203, 221, 222, 226, 227, 390, 392

[56] References Cited

U.S. PATENT DOCUMENTS

| | | | |
|---|---|---|---|
| 1,097,386 | 5/1914 | Boreham | 267/53 |
| 1,186,393 | 6/1916 | Hagemann | 267/53 |
| 1,458,149 | 6/1923 | Reed | 267/52 |
| 1,512,109 | 10/1924 | Laher | 267/47 |
| 1,727,019 | 9/1929 | Shore | 267/53 |
| 2,280,347 | 4/1942 | Olley et al. | 267/52 |
| 2,533,511 | 12/1950 | Rowland et al. | 267/47 |
| 2,600,843 | 6/1952 | Bush | 267/149 |
| 2,643,111 | 6/1953 | Burton | 267/52 |
| 2,654,597 | 10/1953 | Barenyi | 267/52 X |
| 2,829,881 | 4/1958 | Morris | 267/149 |
| 3,142,598 | 7/1964 | Rosen | 267/47 |
| 3,231,291 | 1/1966 | Kozicki et al. | 267/52 X |
| 3,250,546 | 5/1966 | Allison | 267/52 X |
| 3,377,060 | 4/1968 | Sherwood | 267/52 |
| 3,437,333 | 4/1969 | Koch et al. | 267/52 |
| 3,541,605 | 11/1970 | Mohl | 267/47 |
| 3,586,307 | 6/1971 | Brownyer | 267/47 |
| 3,602,523 | 8/1971 | Poulos | 267/52 X |
| 3,968,958 | 7/1976 | Huchette et al. | 267/47 |
| 4,519,590 | 5/1985 | Wells | 267/52 |

FOREIGN PATENT DOCUMENTS

| | | | |
|---|---|---|---|
| 115696 | 8/1984 | European Pat. Off. | 267/53 |
| 54-141944 | 11/1979 | Japan | 267/149 |
| 223781 | 10/1924 | United Kingdom | 267/52 |
| 2100835 | 1/1983 | United Kingdom | 267/47 |

*Primary Examiner*—George E. A. Halvosa
*Assistant Examiner*—Richard R. Diefendorf
*Attorney, Agent, or Firm*—Peter D. McDermott; Roger L. May

[57] ABSTRACT

An improved axle clamp is provided, particularly for use with composite material leaf springs, to securely fix the position of the leaf spring relative to a wheel axle or other suspension system member. The axle clamp comprises a rigid clamp base, a resilient wedge insert, a rigid clamp plate, and a resilient cover pad. The clamp base provides a bottom wall and substantially parallel side walls extending from the bottom wall to form a channel adapted to receive the wedge insert. The inner surface of at least one side wall of the clamp base fairs from both ends into a channel-widening concavity, preferably at the longitudinal mid-point of the channel. The wedge insert has a bottom wall and substantially parallel side walls extending from the bottom wall and forming therewith an inner channel adapted to laterally jacket a leaf spring. The outer surface of the wedge insert substantially fills the clamp base channel and, so, provides a convexity adapted to register with the channel-widening concavity of the clamp base. The clamp plate attaches to the clamp base to clamp the leaf spring between them. The resilient cover pad lies between the clamp plate and the leaf spring. The cover pad and the wedge insert each provides a vertically raised support pad extending laterally across the channel at each end to contact and support the leaf spring. The resilient material is recessed between the support pads.

23 Claims, 6 Drawing Figures

LEAF SPRING CLAMP FOR SYNTHETIC MATERIAL LEAF SPRING

TECHNICAL FIELD

This invention relates to a leaf spring clamp adapted to fix the position of a leaf spring in a suspension system, especially a filament reinforced synthetic material leaf spring on an axle without damage to or dislocation of the reinforcing filaments or resin matrix of the leaf spring. The leaf spring clamp of the invention is especially suitable for use as an axle clamp in motor vehicle suspension systems.

BACKGROUND ART

Composite material leaf springs are known, which springs typically comprise a filler material, for example, glass roving or other filamentary solids, in an organic resin matrix such as thermoplastic or thermosetting plastic. Such springs are shown, for example, in U.S. Pat. Nos. 2,600,843; 2,829,881 and 3,142,598. Known methods of making composite material leaf springs include, for example, filament winding methods, compression molding methods and pultrusion methods.

In the past, composite material leaf springs have been used in automotive vehicle suspension systems with associated hardware to hold the spring accurately in position. Such spring clamping hardware has been fashioned after hardware previously known for use in conjunction with metal leaf springs. In a typical arrangement, the spring is positioned between a clamping plate on one side and the axle or other wheel carrying member on the other side. Often, a second clamping plate or the like is positioned between the spring and the axle to act as a spring seat. Bolts or the like, for example, U-bolts, are used to clamp the clamping plate and spring to the axle. An abrasion resistant pad can be used between the spring and the clamping plate and/or between the spring and the axle (or spring seat). Exemplary clamping hardware for a composite material leaf spring is seen, for example, in U.S. Pat. Nos. 3,968,958; 3,586,307 and 3,541,605.

Known leaf spring clamping hardware has been found inadequate in certain respects for use in conjunction with composite material leaf springs. Specifically, such spring clamping hardware has been found inadequate to hold the spring in a fixed position relative the axle under conditions experienced in ordinary use. More specifically, known spring clamping hardware often has failed to prevent longitudinal movement of the spring, that is, movement of the spring in a direction along its longitudinal axis (which typically is transverse to the longitudinal axis of the axle). While the longitudinal position of the spring could be adequately fixed by providing a hole through the composite material of the leaf spring and bolting the spring to the spring clamping hardware, this presents several disadvantages. Providing the bolt hole in the leaf spring requires additional fabrication time and introduces additional complexity and cost. In addition, the bolt hole significantly weakens the composite material spring, and so the spring must be made larger, heavier and more costly.

Movement of the composite material leaf spring relative the axle or other wheel carrying member in a direction along the longitudinal axis of the leaf spring changes the pivot point of the leaf spring against the axle. Consequently, the spring rate is altered and the spring fails to perform according to design. Moreover, upon flexure of the spring, the compressive and tensile stresses are improperly distributed, which can lead to increased material fatigue and decreased spring life. Moreover, if excessive, such movement can lead to damage to the vehicle powertrain.

A leaf spring clamp suitable for use with a composite synthetic material leaf spring is disclosed in commonly assigned U.S. Pat. No. 4,519,590. Therein a leaf spring clamp is disclosed to comprise a rigid clamp base which forms a channel to jacket the leaf spring, and a resilient insert which is inserted between the leaf spring and the rigid clamp base. The resilient insert fills substantially entirely the space between the leaf spring and the rigid clamp base. It now has been found that displacement of the leaf spring within the clamp, especially large bending displacements of the spring, is impeded disadvantageously by the presence of the insert. In avoiding this problem, however, the resilient insert cannot be eliminated since the leaf spring must be effectively isolated from rigid clamp parts to prevent abrasion and crushing damage to the synthetic material of the spring.

It is an object of the present invention to provide a leaf spring clamp which secures a leaf spring, especially a filament reinforced composite material leaf spring, in position in a suspension system. More particularly, it is an object of the invention to provide an axle clamp which in ordinary use substantially prevents longitudinal movement of the leaf spring, that is, movement of the spring in a direction along its longitudinal axis. Further, it is a particular object of the invention to provide an axle clamp which does not require either damage or dislocation of either the reinforcing filaments or the resin matrix of the leaf spring and, specifically, which does not require a hole through the leaf spring or concavities in the surface of the leaf spring or other complexities in the shape of the leaf spring.

DISCLOSURE OF THE INVENTION

According to the present invention, a leaf spring clamp adapted to secure leaf spring, especially a synthetic material leaf spring, in position in a suspension system comprises a rigid clamp base comprising a bottom wall and two side walls, the side walls being substantially parallel to each other and each extending upwardly from the bottom wall to form therewith a longitudinal channel, wherein an inward surface of at least one of the side walls fairs from each longitudinal end into a channel-widening concavity. A resilient wedge insert adapted to be positioned within and to register with the longitudinal channel formed by the clamp base, comprises a bottom wall adapted to lie adjacent to and in substantial contact with the inward surface of the clamp base bottom wall, and two side walls being substantially parallel to each other and each extending upwardly from the bottom wall of the wedge insert to form therewith an inner longitudinal channel adapted to jacket the leaf spring laterally. The inward surface of each of the wedge insert side walls is adapted to contact the leaf spring along substantially the entire longitudinal dimension of such inner channel, and the outer suface of each side wall of the wedge insert is adapted to lie adjacent to and in substantial contact with the inward surface of the corresponding clamp base side wall. That is, each of the wedge insert side walls has greater lateral dimension, i.e. depth, corresponding to the channel-widening concavity, if any, of the corresponding, i.e. adjacent, clamp base side wall, so as to substantially fill such channel-widening concavity. The wedge insert further comprises a resilient support pad at each of the two longitudinal ends of the inner channel. The support pads extend within the inner channel laterally between (i.e., substantially orthogonal to) the side walls of the wedge insert and, in assembly, are adapted to contact and support the leaf spring. That is, each support pad provides an upward facing support surface which is vertically offset, i.e., higher than the channel-side surface of the bottom wall between the two support pads. Thus, a cavity is formed between the support pads which is adapted to accommodate leaf spring displacement within the clamp assembly during flexure of the leaf spring. The leaf spring clamp assembly further comprises a substantially rigid clamp plate adapted to be fixedly attached to the clamp base to clamp a leaf spring between them within the aforesaid inner channel. Finally, the leaf spring clamp assembly comprises a resilient cover pad adapted to be positioned between the clamp plate and the leaf spring and to cooperate with the resilient wedge insert to laterally encircle the leaf spring. The cover pad comprises a sheet or layer of resilient material and a resilient support pad at each of the longitudinal ends of such resilient sheet. These two upper support pads are longitudinally spaced substantially the same distance as are the wedge insert support pads. Each provides a downward facing surface vertically offset from the channel-side surface of the cover pad between the two upper support pads. Such downward facing support surfaces are adapted to contact and support the leaf spring. Thus, as in the case of the resilient wedge insert on the opposite side of the leaf spring, a cavity or recessed area is formed between the upper support pads, which cavity is adapted to accommodate leaf spring displacement within the axle clamp during flexure of the leaf spring. In other words, a leaf spring in assembly with a leaf spring clamp of the present invention would be sandwiched at each end of the axle clamp between a support pad of the wedge insert and a support pad of the cover pad, and that portion of the leaf spring between the two pairs of support pads would have a cavity above it and below it to accommodate verticle curvature of the leaf spring within the axle clamp.

The present invention provides an effective and inexpensive solution to the problems discussed above regarding the use of clamping means for composite material leaf springs. The leaf spring clamp of the present invention effectively prevents movement of the leaf spring not only laterally and vertically (vertically meaning in the plane of flexure of the spring and movement in this sense meaning movement of the entire spring upward or downward relative to the suspension system member to which the clamp assembly is attached), but also longitudinally (i.e., movement along the longitudinal axis of the leaf spring). Thus, the proper leverage point is maintained for the leaf spring in the suspension system, and consequently, the spring rate is not altered and the spring performs more consistently according to design. Also, upon flexure of the spring, the compressive and tensile stresses are more properly distributed, thus avoiding material fatigue which otherwise could decrease the useful life of the spring. Specifically, in use with the present invention a leaf spring advantageously exhibits more nearly theoretical spring performance do to the cavities provided within the leaf spring clamp to accommodate curvature of the leaf spring during flexure. That is, the performance of the leaf spring is not inhibited by the need to compress resilient padding material within the clamp during flexure of the spring. Nevertheless, the leaf spring clamp of the present invention protects the leaf spring against contact with rigid clamp assembly components, which is especially significant in use with composite material leaf springs. The leaf spring clamp of the present invention is seen to be particularly advantageous in view of its ability to fix or secure the position of a leaf spring, particularly a filament reinforced composite material leaf spring, without damaging either the reinforcing filaments or the resin matrix of the leaf spring. It is particularly advantageous that the clamp provides such position-fixing function without the necessity of being bolted to the leaf spring or otherwise positively attached to it. This advantage presents a significant advance in the art since it has been found that the presence of bolt holes into or thorugh the leaf spring and like interuptions and dislocations in the filament reinforced synthetic material of a composite material leaf spring can significantly reduce the strength, structural integrity and durability of the leaf spring. Also, the additional fabrication time, complexity and cost required to provide such attachment means is avoided. Accordingly, leaf springs for use with the leaf spring clamp of the present invention can be designed smaller and of lighter weight for a given application. Reduced material costs and reduction in weight are highly significant advantages in applications such as motor vehicle suspensions, for which the present invention is especially well suited.

Other features and advantages of the invention will become more apparent from the following, detailed description thereof and from the drawings illustrating the preferred embodiments and best mode of carrying out this invention.

DESCRIPTION OF PREFERRED EMBODIMENTS

Figure 1:
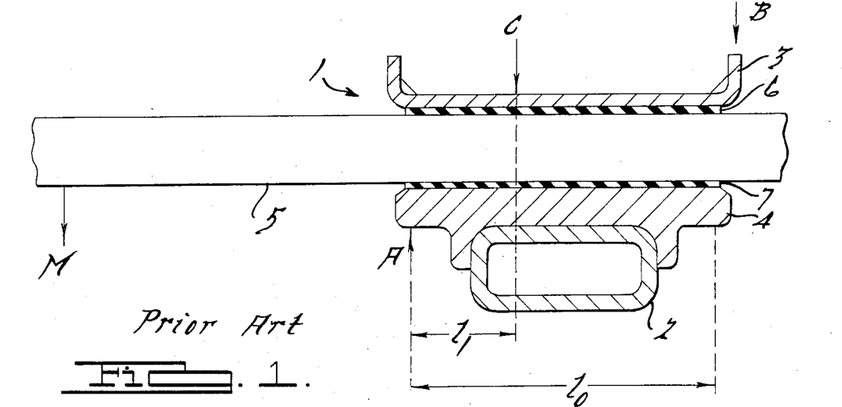
FIG. 1 is a side elevation view of a leaf spring axle clamp in association with an axle, according to a design previously known to the skilled of the art.

Referring now to the drawings, FIG. 1 shows a leaf spring clamp 1, also referred to as an axle clamp, in association with axle 2. The axle clamp comprises an upper rigid member 3 and a lower rigid member 4. A leaf spring 5 is sandwiched between the upper and lower rigid members. Resilient pads 6 and 7 lie mediate the leaf spring and the upper and lower rigid members, respectively, to cushion the leaf spring from the rigid clap members during flexure of the leaf spring. Ideally, when moment or force M is applied to the leaf spring, it is resisted by the couple A—B. Thus, the applicable force equation is:

$$M=(A)(l_0),$$

where A=B. However, it can be seen that upon flexure, the spring will curve and that portion of the spring lying inside the axle clamp will attempt to bend within the clamp. The effect is to move the resisting force inward to position C. That is, force M is resisted by the couple $A_2$—C and the relevant force equation is:

$$M=(A_2)(l_1)$$

where $A_2$=C. Since distance $l_1$ is less than distance $l_0$, it necessarily follows that force $A_2$ is greater than force A. In short, increased forces are brought to bear against the leaf spring and in the case of fiber reinforced synthetic material leaf springs this can lead to fiber "broom sticking" wherein fibers are freed from the resin matrix with a corresponding decrease in spring strength and performance. This also can lead to shear failures of the spring, because the higher forces cause a higher shear stress in the spring region between the two couple forces.

Figure 2:
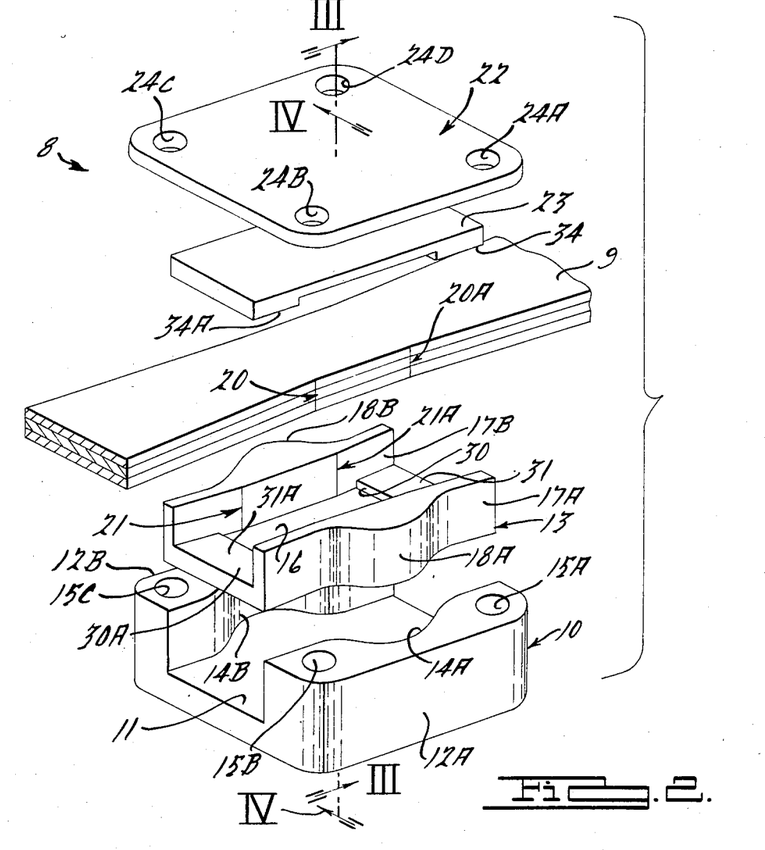
FIG. 2 is an exploded view in perspective of a leaf spring clamp assembly according to a preferred embodiment of the present invention.
Figure 3:
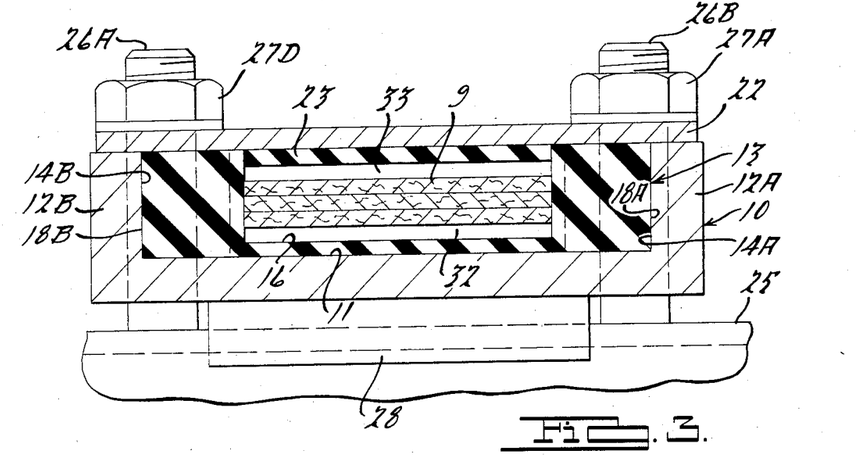
FIG. 3 is an elevation view in cross-section of the assembly of FIG. 2 taken through line III—III, shown mounted to an axle using appropriate additional hardware.
Figure 4:
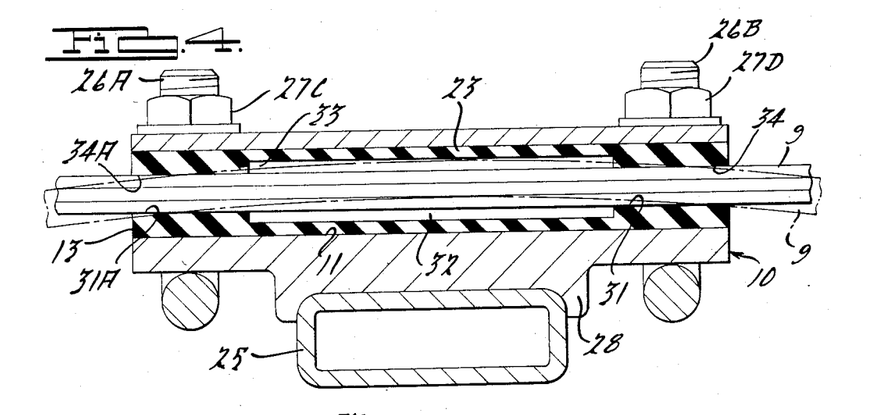
FIG. 4 is an elevation view in cross-section of the assembly of FIG. 2 taken through line IV—IV, shown mounted to an axle using appropriate additional hardware.

Referring now to FIGS. 2-4, leaf spring clamp 8 is shown in assembly with leaf spring 9, the leaf spring clamp comprising a clamp base 10 adapted to be secured such as by welding or other known means to a support member such as an axle in a motor vehicle suspension system. The clamp base has a bottom wall 11 and parallel side walls 12A, 12B extending the bottom wall to form therewith a channel. The channel is adapted to receive the second component of the leaf spring assembly, wedge insert 13. Since composite material leaf springs typically are of substantially rectilinear cross-section, the side walls of the clamp base typically will be substantially perpendicular to the bottom wall and, correspondingly, the side walls of the wedge insert will be substantially perpendicular to the bottom wall of the wedge insert. The inner surface of at least one, and preferably both, of the side walls of the clamp base provides at least one channel-widening concavity 14A, 14B. That is, the channel-side surface of the side wall fairs into a lateral concavity such that the channel formed by the bottom wall and side walls of the clamp base becomes laterally wider than at the longitudinal ends of the clamp base (i.e., at the ends of the channel). The clamp base preferably further provides bolt holes 15A, 15B, 15C, and 15D (15D not shown) to facilitate assembly of the leaf spring clamp. Suitable means such as, for example, U-bolts or the like passing through such bolt holes can be used according to certain embodiments to secure the leaf spring clamp to the carrying axle or other support member of the suspension system in a conventional manner.

The wedge insert 13 has a bottom wall 16 and substantially parallel side walls 17A, 17B extending upwardly from the bottom wall to form therewith an inner channel adapted to jacket a leaf spring. As noted above, such inner channel typically will be rectilinear since composite material leaf springs are typically of rectilinear cross-section. The configuration of the outer surface of the wedge insert is such as to register with, i.e. to lie adjacent to and in substantial contact with the inward surface of the clamp base. That is, the wedge insert should fit tightly within the channel formed by the clamp base. Thus, the outer surface of each side wall of the wedge insert provides a convexity 18A, 18B adapted to engage and substantially fill the corresponding channel-widening concavity of the clamp base. That is, each side wall wedge insert provides a convex portion or region which follows and is adapted to register with the channel-widening concave region of the adjacent side wall of the clamp base. Of course, the clamp base side walls can provide multiple position-fixing concavities and the wedge insert then would provide corresponding convexities preferably for each of those multiple concavities.

While not wishing to be bound by theory, it presently is understood that the channel-widening concavity of the clamp base functions together with the convexity provided by the outer surface of the wedge insert side wall to prevent movement of the leaf spring relative to the leaf spring clamp and, thus, relative to the suspension member to which the leaf spring clamp is attached. Particularly, such convexity/concavity feature is seen to prevent longitudinal movement of the leaf spring, that is, movement in a direction along the longitudinal axis of the leaf spring. Movement of the leaf spring would cause corresponding movement of the tight-fitting wedge insert which jackets it. Any such movement of the wedge insert, however, would cause the convex portion of the side wall wedge insert to be shifted out of the corresponding concavity in the side wall of the clamp base whereupon the wedge insert would be compressed and the lateral dimension of the inner channel jacketing the leaf spring would be reduced. Thus, a wedge effect is provided, whereby longitudinal movement of the spring causes the wedge insert to more tightly grip the sides of the spring and to more strongly resist such longitudinal movement.

Preferably the two side walls of the clamp base provide symmetrical and centrally disposed channel-widening concavities, as shown in FIG. 2. Preferably the depth of the concavity in the side wall of the clamp base is uniform in a direction normal to the bottom wall of the clamp base, also as shown in FIG. 2. Leaf spring clamps according to such prefered embodiments have been found to function exceptionally well to fix the position of synthetic material leaf springs in the suspension system of a motor vehicle.

As noted above, the wedge insert is adapted to receive and jacket a leaf spring, typically at about the longitudinal midpoint of the leaf spring. That is, the inner surface of the wedge insert which forms the inner channel is contoured to contact the corresponding surface of the leaf spring. Typically, a composite material leaf spring will provide an axle attachment region, a central portion of substantially constant width (i.e., substantially constant lateral dimension). The leaf spring is generally not, however, of constant-width along its entire length but, rather, becomes wider toward each end before again becomming narrow at each eye of the leaf spring. According to a preferred embodiment of the present invention, the leaf spring clamp extends longitudinally over a sufficient portion of the leaf spring to jacket not only the constant-width axle attachment region of the leaf spring but also some of the wider portion of the leaf spring on either side thereof. The wedge insert is fashioned such that the contour of its inner channel corresponds to the contour of the leaf spring and, thus, the inner channel has an hour-glass shape in plan view, becoming somewhat wider (i.e., having increased lateral dimension) toward the longitudinal ends of the inner channel. This can be seen most clearly in FIG. 2 showing a leaf spring clamp assembly according to a preferred embodiment of the invention. In leaf spring 9 (the ends of which are broken away) lines 20 and 20A indicate the boundry between the central constant-width portions of the leaf spring and the widening portion on either side thereof. Correspondingly, lines 21 and 21A shown in the inner channel formed by the wedge insert are the boundry between the central portion of the inner channel adapted to jacket the central constant-width portion of the leaf spring and the portions of the inner channel on either side thereof which fair outwardly so as to be adapted to jacket part of the widening portion of the leaf spring. While not wishing to be bound by theory, it presently is understood that any longitudinal movement of the leaf spring relative to the clamp would produce a wedge effect, whereby a constantly widening portion of the leaf spring would be attempting to enter the more narrow central portion of the inner channel formed by the wedge insert. Obviously, any such longitudinal movement would be effectively prevented by such wedge effect in combination with the above discussed wedge effect provided by the interaction of the side wall convexity of the wedge insert and side wall concavity of the clamp base. According to one most preferred embodiment, the wedge insert and the resilient cover pad each is adhesively bonded to the leaf spring using any of numerous well known and commercially available adhesives. Such adhesive bonding has been found to prevent squirming of the resilient members and so reduces the mechanical working and consequent deterioration thereof. Also, the adhesive bond excludes dirt and the like from between the spring and the resilient members and so prevents abrasion damage to the spring.

The remaining components of the leaf spring clamp of the invention comprise a rigid clamp plate 22 and a resilient cover pad 23. As seen in FIGS. 2–4, the cover plate 22 is adapted to be fixably attached to the clamp base to clamp the leaf spring between them within the above described inner channel of the wedge insert. Thus, in the preferred embodiment illustrated in the drawings, the clamp base provides attachment holes 24A, 24B, 24C, and 24D corresponding to holes 15A–15D of the clamp base. The resilient cover pad 23 is adapted to be positioned between the leaf spring and the clamp plate. Also shown in FIGS. 3 and 4 for purposes of illustrating an exemplary application of the present invention are axle 25 and attachment means for securing the leaf spring clamp assembly to the axle. The attachment means comprises a pair of U-bolts 26A and 26B which extend through the above described bolt holes in the axle clamp assembly. The U-bolts are held by four fastening nuts 27A, 27B (not shown), 27C and 27D corresponding to bolt holes 15A–15D, respectfully. It will be noted that in the embodiment shown in the drawings the lower portion 28 of the clamp base 10 forms a so-called spring seat attached to the axle by any suitable means such as welding, etc.

The present invention is significantly characterized in that the wedge insert comprises a resilient support pad at each of the two longitudinal ends of its inner channel. As seen in FIG. 2, support pads 30 and 30A are longitudinally spaced from each other and extend within the channel laterally between the wedge insert side walls. These support pads provide an upward surface 31, 31A, respectively, which is higher than the inner surface of the wedge insert bottom wall between the two support pads. The support pads are adapted to contact and support the leaf spring and, accordingly, in assembly with a leaf spring there is a cavity 32 formed between the leaf spring and the bottom wall of the wedge insert. Cavity 32 can be seen in FIGS. 3 and 4. As a further characterizing aspect of the invention, the cover pad 23, which is adapted to cooperate with the wedge insert to laterally encircle the leaf spring with resilient material, also provides support pads. More specifically, the cover pad 23 comprises resilient material with a laterally extending resilient support pad 24, 24A at each end. The upper support pads provided by the cover pad are longitudinally spaced substantially the same distance as are the lower support pads within the channel formed by the wedge insert. The upper support pads are adapted to contact and support the leaf spring, whereby in assembly with a leaf spring a cavity is formed between the leaf spring and the inward surface of the cover pad between the two upper support pads. Such cavity 33 is seen in FIGS. 3 and 4. While the most advantageous dimensions for the upper and lower support pads will be determined in view of the intended application of each particular leaf spring clamp assembly, it generally is preferred that the surface thereof intended to contact the leaf spring each extend longitudinally approximately 10%–30% of the overall longitudinal dimension of the inner channel.

As seen in FIG. 4, longitudinal bending of the leaf spring in normal use causes it to have a curved profile. Significantly, even that portion of the leaf spring within the leaf spring clamp attempts to follow the aforesaid curved profile. According to the present invention the cavity formed above and below the leaf spring between the support pads within the leaf spring clamp allows the leaf spring to be vertically displaced within the clamp without encountering resistance from resilient pading material typically used to cushion and protect the leaf spring from contact with rigid members of the clamp assembly. Downward bending of the ends of the leaf spring displaces the center of the leaf spring within the leaf spring clamp assembly upwardly into the cavity formed between the leaf spring and the resilient cover pad. In like manner, upward bending of the ends of the leaf spring would cause displacement of the leaf spring within the clamp assembly into the cavity formed between the leaf spring and the wedge insert. Thus, in FIG. 4, the leaf spring is shown (in phantom) to be curved and that portion of the leaf spring between the support pads is displaced into the cavity 33 formed between the leaf spring and the cover pad. Thus, according to the present invention, a leaf spring will perform better and more nearly according to theoretical design specifications. Moreover, the forces between the clamp assembly and the leaf spring in resisting the bending forces applied to the leaf spring will be less, as discussed above in connection with FIG. 1. For this reason the leaf spring and clamp assembly will prove more durable and more resistant to failure.

Figure 6:
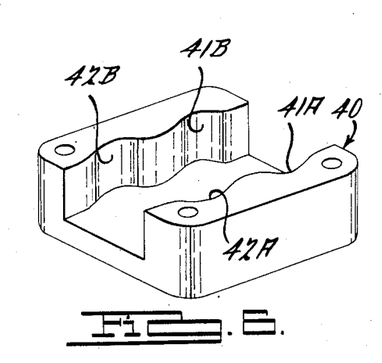
FIG. 6 is a perspective view of the clamp base component of a leaf spring clamp according to an alternative embodiment of the invention.

The preferred configuration for the channel-widening concavity of the clamp base and the corresponding convexity of the wedge insert is that shown in FIGS. 2–4, wherein a single concavity is provided in each of the side walls of the clamp base, the concavities being preferably substantially symmetrical through a plane bisecting the channel longitudinally perpendicular to the bottom wall. Preferably each such concavity gradually and continuously widens as one moves longitudinally from the edge of the channel to the midpoint of the channel and thereafter gradually and continuously narrows to its original width at the opposite end. Also, typically the channel will be of uniform lateral dimension (i.e. width) over the entire height of the side walls. Suitable alternative configurations will be apparent to the skilled of the art in view of the present disclosure. In general, a suitable configuration will depend, in part, upon the application to which the axle clamp assembly is to be put and upon the forces likely to be encountered by the leaf spring in normal use. In general, it will be within the skill of those of average skill in the art, in view of the present disclosure, to provide a leaf spring clamp according to the present invention, having a clamp base and wedge insert configuration suitable to substantially fix the leaf spring in position. One exemplary alternative configuration is illustrated in FIG. 6, wherein a clamp base 40 is shown, the side walls of which provide two convexities each, specifically convexities 41A and 42A in one side wall and 41B and 42B in the opposite side wall.

Figure 5:
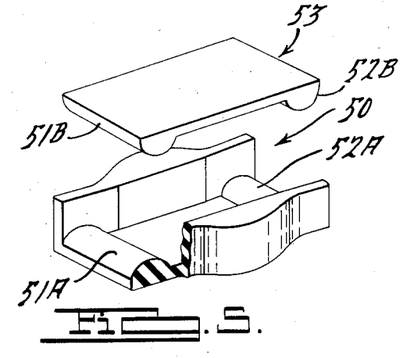
FIG. 5 is a perspective view in partial cross-section of the wedge insert and cover pad components of a leaf spring clamp according to an alternative embodiment of the invention.

In FIG. 5 one alternative embodiment for the support pads is illustrated. Therein a wedge insert 50 is shown in partial cross-section, having support pads 51A and 52A of semi-cylindrical configuration (rather than of rectilinear configuration as in FIG. 2). It should be understood that while the support pads are shown to be unitary with the wedge insert, optionally they are separate components attached to the wedge insert or held in place by the compressive force of the clamp assembly. Also in FIG. 5 is seen a cover pad 53 according to an alternative embodiment, wherein the upper support pads 51B and 52B are semi-cylindrical in configurations. Additional suitable configurations will be apparent to the skilled of the art in view of the present disclosure.

The leaf spring clamp of the present invention is suitable for use in conjunction with leaf springs fabricated of metal but is particularly advantageous for use with composite material leaf springs. Such composite materials typically comprise filler materials such as, for example, aramid fibers, graphite fibers, metal fibers, glass roving or other filamentary solids and/or non-filamentary solids. Glass roving is often preferred in view of the physical properties of the resulting leaf spring and in view of the ease and cost efficiency of manufacturing the leaf springs by filament winding techniques. The composite material further comprises an organic solid matrix such as, for example, polyester, epoxy or other suitable thermoset plastic or a suitable thermoplastic. As an alternative to filament winding, the leaf spring can be manufactured by pultrusion methods or by compression molding or other methods known to the skilled of the art.

The leaf spring clamp of the invention can be employed together with a suitable leaf spring in any application for which metal or composite meaterial leaf springs are suitable, and can be used according to methods well known to the skilled of the art. Thus, for example, the leaf spring clamp can be used in the suspension system of a motor vehicle in conjunction with additional suitable hardware, substantially as shown in FIGS. 2-4.

Preferably, the clamp base comprises suitable metal, for example steel, and the channel-widening concavities within the longitudinal channel of the clamp base can be provided during the manufacture of the clamp base. In addition to cast metal, stamped metal and the like, various other suitable materials and methods of forming the clamp base and methods of forming the channel-widening concavities thereof will be apparent to the skilled of the art in view of the present disclosure. Thus, for example, in certain applications the clamp base can be formed of suitable synthetic material, for example filament reinforced thermoset plastic and the like.

As noted above, it is presently understood that the invention functions by providing a wedge effect between the wedge insert and the clamp base, whereby a frictional engagement of the inner surface of the wedge insert by the leaf spring is generated by translation of longitudinal forces from the leaf spring into lateral forces within the leaf spring clamp. Thus, as it is presently understood, increased loads on the leaf spring serve to increase the wedge effect and thus to increase the holding capability of the clamp. In view of this, it will be recognized that the invention provides a significant advance in the art, since the leaf spring is held in position without any positive attachment between the clamp and the leaf spring. No damage need be done to the leaf spring in the nature of bolt holes or the like nor any distortion or dislocation of the surface of the leaf spring to facilitate an attachment between the leaf spring and the clamp.

The thickness and configuration of the wedge insert bottom wall and side walls are not critical, except that the convexities of the side walls should be designed to engage and substantially fill the corresponding channel-widening concavities of the clamp base. The material of the wedge insert and the associated support pads generally should be of sufficient thickness and resilience to prevent undue stress concentration against the surface of the leaf spring, that is, to disperse pressures between the spring and the rigid components of the clamp. When used in the suspension system of a motor vehicle or other similar application, the wedge insert and support pads preferably are sufficiently thick to substantially dampen vibrations which otherwise would be transmitted from the axle through the leaf spring to the vehicle chassis. The resilient material also should be sufficiently tough to withstand the mechanical working of the clamp against the leaf spring and to protect the leaf spring against such mechanical working. Suitable materials for the wedge insert include, for example, natural rubber, suitable urethane rubbers, neoprenes, and the like. Preferably the resilient material is fabric reinforced, preferably cloth reinforced, since such reinforced materials have been found to provide excellent tear resistance, even following prolonged use. Most preferred is cloth reinforced urethane or neoprene. Natural rubber is less preferred when the axle clamp assembly is intended for use in the suspension system of a motor vehicle or other like environment in which it may be exposed to oil, gasoline and the like, in view of the poor resistance of natural rubber to these elements. For such motor vehicle use a urethane rubbr is preferred having hardness equal to about 30–40 shore D, and sufficient toughness to withstand prolonged mechanical working. Other resilient materials suitable to provide the wedge function of the wedge insert and otherwise suitable for use in the preferred and alternative environments of the invention will be apparent to those skilled in the art in view of the present disclosure.

While the thickness of the resilient upper pad, i.e., cover pad, is not critical in all applications, it should be sufficiently thick to disperse pressures transmitted from the clamp to the leaf spring and to protect the leaf spring against any hard edges, etc. presented by the clamp base or by the clamp plate. As for the lower support pads, the upper support pads should be of sufficient verticle dimension to provide a corresponding cavity adapted to accommodate leaf spring displacement during normal spring bending. When used in the suspension system of a motor vehicle or other similar application, the resilient upper pad and upper support pads together are preferably sufficiently thick to aid in substantially dampening vibrations which otherwise would be transmitted from the axle to the vehicle chassis. In general, it will be within the ability of those skilled in the art, in view of the present disclosure, to determine a suitable configuration and thickness for the resilient upper pad for use in leaf spring clamp assemblies according to the above-described or alternate embodiments of the present invention. Suitable materials for the resilient sheet will be apparent to those skilled in the art in view of the present disclosure and include, for example, those materials used for the wedge insert such as natural rubber and synthetic rubbers, for example neoprenes, urethanes, and the like.

While the invention has been shown and described in its preferred embodiment, it will be clear to those skilled in the art that changes and modifications can be made thereto without departing from the scope of the invention as defined in the appended claims.

INDUSTRIAL APPLICATION

It will be obvious from the foregoing that this invention has industrial applicability to suspension systems employing a leaf spring, especially a motor vehicle suspension system, and provides a leaf spring clamp wherein a leaf spring is prevented from shifting its position relative to a support member in a direction along the longitudinal axis of the leaf spring. In addition, the clamp of the present invention has industrial applicability to suspension systems other than for motor vehicles, for example, for stationary machines and devices, and further has industrial applicability to uses such as will be apparent in view of the present disclosure to those skilled in various related arts.

I claim:

1. A leaf spring clamp assembly adapted to secure a leaf spring in position in a suspension system, said leaf spring clamp assembly comprising:

a rigid clamp base comprising a bottom wall and two side walls, said side walls being substantially parallel to each other and each extending upwardly from said bottom wall to form therewith a longitudinal channel, wherein an inward surface of at least one of said side walls fairs from each longitudinal end into a channel-widening concavity;

a resilient wedge insert adapted to be positioned within said longitudinal channel, comprising a wedge insert bottom wall adapted to lie adjacent to the clamp base bottom wall, and two wedge insert side walls being substantially parallel to each other and each extending upwardly from said wedge insert bottom wall to form therewith an inner longitudinal channel adapted to jacket said leaf spring laterally, wherein the inward surface of each said wedge insert side wall is adapted to contact said leaf spring along substantially the entire longitudinal dimension of said inner longitudinal channel, the outer surface of each said wedge insert side wall being adapted to lie adjacent and in substantial contact with the corresponding clamp base side wall to substantially fill said channel-widening concavity, said wedge insert further comprising a resilient support pad at each longitudinal end of said inner channel, said support pads being adapted to contact and support said leaf spring, said support pads extending within said inner channel laterally between said wedge insert side walls, the upper surface of said support pads being higher than the wedge insert bottom wall between said support pads to form a cavity, said cavity being substantially longitudinally centered within said leaf spring clamp and being adapted to accommodate leaf spring displacement within said leaf spring clamp upon bending of said leaf spring;

a substantially rigid clamp plate adapted to be fixedly attached to said clamp base to clamp said leaf spring between them within said inner channel; and a resilient cover pad adapted to be positioned between said clamp plate and said leaf spring and to cooperate with said wedge insert to laterally encircle said leaf spring, said cover pad comprising a sheet of resilient material and a laterally extending resilient upper support pad at each longitudinal end of said sheet, said upper support pads being longitudinally spaced substantially the same distance as said wedge insert support pads, each providing a surface raised from the surface of said sheet, which raised surface is adapted to contact and support said leaf spring to form an upper cavity, said upper cavity being substantially longitudinally centered within said leaf spring clamp and being adapted to accommodate leaf spring displacement within said leaf spring clamp upon bending of said leaf spring.

2. The leaf spring clamp assembly of claim 1, wherein each said wedge insert support pad is integral with said wedge insert.

3. The leaf spring clamp assembly of claim 1, wherein each said wedge insert support pad is unitary with said wedge insert.

4. The leaf spring clamp assembly of claim 1, wherein said cover pad support pads are integral with said sheet of resilient material.

5. The leaf spring clamp assembly of claim 1, wherein said cover pad support pads are unitary with said sheet of resilient material.

6. The leaf spring clamp assembly of claim 1, wherein said wedge insert support pads are substantially rectilinear, the upper surface thereof being substantially flat.

7. The leaf spring clamp assembly of claim 6, wherein said substantially flat upper surface of each said wedge insert support pad extends longitudinally aproximately 10%-30% of the longitudinal dimension of said inner channel.

8. The leaf spring clamp assembly of claim 1, wherein said cover pad support pads are substantially rectilinear, the surface thereof which is adapted to contact said leaf spring being substantially flat.

9. The leaf spring clamp assembly of claim 8, wherein said substantially flat surface of each said cover pad support pads extends longitudinally approximately 10%-30% of the longitudinal dimension of said inner channel.

10. The leaf spring clamp assembly of claim 1, wherein said wedge insert support pads are substantially semi-cylindrical.

11. The leaf spring clamp assembly of claim 1, wherein said cover pad support pads are substantially semi-cylindrical.

12. The leaf spring clamp asembly of claim 1, wherein said wedge insert comprises a material selected from the group consisting of natural and synthetic rubbers.

13. The leaf spring clamp assembly of claim 1, wherein said wedge insert comprises cloth fabric-reinforced synthetic rubber.

14. The leaf spring clamp assembly of claim 1, wherein said wedge insert and said cover pad each comprises resilient material of hardness equal to about 30–40 Shore D.

15. The leaf sring clamp assembly of claim 14, wherein said resilient material comprises urethane rubber.

16. The leaf spring clamp assembly of claim 1, wherein said channel-widening concavity extends to a uniform lateral dimension over substantially the entire vertical dimension of said clamp base side wall at each longitudinal distance from the end of said channel.

17. The leaf spring clamp assembly of claim 1, wherein at least one of said side walls of said clamp base fairs from each longitudinal end into a single channel-widening concavity longitudinally centered about the longitudinal mid-point of said side wall.

18. The leaf spring clamp of claim 17, wherein each said side wall of said clamp base fairs from each longitudinal end into a single channel-widening concavity longitudinally centered about the longitudinal mid-point of said side wall.

19. The leaf spring clamp assembly of claim 1, wherein at least one of said side walls of said clamp base fairs from each longitudinal end into a series of channel-widening concavities.

20. The leaf spring clamp assembly of claim 1, wherein each of said side walls of said clamp base fairs from each longitudinal end into a series of channel-widening concavities.

21. A leaf spring clamp assembly adapted to secure a leaf spring in a position in a suspension system, said leaf spring clamp assembly comprising:
(A) a rigid clamp base comprising a bottom wall and two substantially symmetrical side walls, said side walls being substantially parallel to each other and each extending upwardly from said bottom wall substantially perpendicular thereto, to form with said bottom wall a longitudinal channel, wherein an inward surface of each said side wall fairs from each longitudinal end into a single longitudinally centered channel-widening concavity of uniform lateral width over its entire height at each longitudinal distance from the end of the channel;
(B) a resilient wedge insert comprising urethane rubber of hardness about 30–40 shore D, adapted to be received by said clamp base longitudinal channel, comprising a wedge insert bottom wall adapted to lie adjacent and substantially parallel to said clamp base bottom wall, and two substantially symmetrical side walls, said side walls being substantially parallel to each other and each extending upwardly substantially perpendicular to said wedge insert bottom wall to form therewith an inner longitudinal channel adapted to laterally jacket said leaf spring, wherein the inward surface of each said wedge insert side wall is adapted to contact said leaf spring along substantially the entire longitudinal dimension of said inner channel, the outer surface of each said wedge insert side wall being adapted to follow the contour of the inner surface of the corresponding clamp base side wall to substantially fill the channel-widening concavity thereof, said wedge insert further comprising at each longitudinal end of said inner channel a resilient support pad unitary with the wedge insert bottom wall, said support pads being adapted to contact and support said leaf spring and each extending within said inner channel laterally between said wedge insert side walls and longitudinally approximately 10%–30% of the longitudinal dimension of said inner channel, said support pads extending upwardly from said wedge insert bottom wall a distance less than that of said wedge insert side walls to provide a substantially flat upper surface higher than the inner surface of said wedge insert bottom wall to form a cavity, said cavity being substantially longitudinally centered within said leaf spring clamp and being adapted to accommodate vertical displacement of said leaf spring within said leaf spring clamp during longitudinal vertical bending of said leaf spring;
(C) a rigid clamp plate adapated to be fixedly attached to said clamp base to clamp said leaf spring between them within said inner channel; and
(D) a resilient cover pad of longitudinal dimension substantially equal to that of said wedge insert, adapted to lie between said clamp plate and said leaf spring and to cooperate with said wedge insert to space said leaf spring from rigid components of said leaf spring clamp, said cover pad comprising a sheet of urethane rubber of hardness about 30–40 Shore D and unitary therewith two upper support pads extending laterally at each longitudinal end of said sheet, each said cover pad support pad being of longitudinal dimension substantially equal to that of said wedge insert support pads, said cover pad support pads being longitudinally spaced a distance substantially equal to the longitudinal distance between the support pads of said wedge insert, each said cover pad support pad being substantially rectilinear with a substantially flat surface extended downwardly from the cover pad and adapted to contact and support said leaf spring to form an upper cavity, said upper cavity being substantially longitudinally centered within said leaf spring clamp and being adapted to accommodate vertical displacement of said leaf spring within said leaf spring clamp during longitudinal vertical bending of said leaf spring.

22. A leaf spring clamp assembly comprising:
(A) a leaf spring having top and bottom surfaces each extending laterally and longitudinally, and side surfaces extending vertically and longitudinally, said leaf spring having a longitudinally central section of substantially constant cross-sectional size and shape and a terminal section of continuously increasing lateral dimension extending longitudinally from each end of said central section;
(B) a rigid clamp base comprising a bottom wall and two substantially symmetrical side walls, said side walls being substantially parallel to each other and each extending upwardly from said bottom wall substantially perpendicular thereto, to form with said bottom wall a longitudinal channel, wherein an inward surface of each said side wall fairs from each longitudinal end into a single longitudinally centered channel-widening concavity of uniform lateral width over its entire height at each longitudinal distance from the end of the channel;

(C) a resilient wedge insert comprising urethane rubber of hardness about 30–40 Shore D, adapted to be received by said clamp base longitudinal channel, comprising a wedge insert bottom wall adapted to lie adjacent and substantially parallel to said clamp base bottom wall, and two substantially symmetrical side walls, said side walls being substantially parallel to each other and each extending upwardly substantially perpendicular to said wedge insert bottom wall to form therewith an inner longitudinal channel adapted to laterally jacket said leaf spring about a section of said leaf spring including said central section and a portion extending longitudinally to each side of said central section, wherein the inward surface of each said wedge insert side wall is adapted to contact substantially the entire leaf spring side surface within said leaf spring clamp, the outer surface of each said wedge insert side wall being adapted to follow the contour of the inner surface of the corresponding clamp base side wall to substantially fill the channel-widening concavity thereof, said wedge insert further comprising at each longitudinal end of said inner channel a resilient support pad unitary with the wedge insert bottom wall, each said support pad being in contact wiht the bottom surface of said leaf spring and supporting said leaf spring, each said support pad extending within said inner channel laterally between said wedge insert side walls and longitudinally approximately 10–30% of the longitudinal dimension of said inner channel, said support pads extending upwardly from said wedge insert bottom wall to a height less than that of said wedge insert side walls to provide a substantially flat upper surface higher than the inner surface of said wedge insert bottom wall to form a cavity between said leaf spring and said wedge insert bottom wall, said cavity being substantially longitudinally centered within said leaf spring clamp and being adapted to accommodate vertical displacement of said leaf spring within said leaf spring clamp during longitudinal vertical bending of said leaf spring;

(D) a rigid clamp plate fixedly attached to said clamp base, clamping said leaf spring between them within said inner channel; and (E) a resilient cover pad of longitudinal dimension substantially equal that of said wedge insert, lying between said clamp plate and said top surface of said leaf spring, cooperating with said wedge insert to space said leaf spring from rigid components of said leaf spring clamp, said cover pad comprising a sheet of urethane rubber of hardness about 30–40 Shore D and unitary therewith two upper support pads extending laterally at each longitudinal end of said cover pad, each said upper support pad being of longitudinal dimension substantially equal to that of said wedge insert support pads, said upper support pads being longitudinally spaced a distance substantially equal to the longitudinal distance between said wedge insert support pads, each said upper support pad forming a substantially rectilinear pad having a substantially flat surface extended downwardly from said cover pad, said upper support pad flat surfaces contacting said top surface of said leaf spring to form an upper cavity, said upper cavity being substantially longitudinally centered within said leaf spring clamp and being adapted to accommodate vertical displacement of said leaf spring within said leaf spring clamp during longitudinal vertical bending of said leaf spring.

23. The leaf spring clamp assembly of claim 22, wherein said leaf spring is adhesively bonded to said wedge insert and to said cover pad.

* * * * *